United States Patent Office 2,712,503
Patented July 5, 1955

2,712,503
METHOD OF TREATING FOOD STUFFS

Jens Christian Christensen Dyekjaer, Esbjerg, Denmark

No Drawing. Application October 10, 1951,
Serial No. 250,789

Claims priority, application Denmark October 13, 1950

3 Claims. (Cl. 99—166)

This invention relates to a method of treating food stuffs and more particularly to the preparation of food products such as fish, meat, poultry and other comestibles for cold storage.

The main object of my invention is to provide an improved method whereby the food products are preserved in a condition closely approximating their condition when in a fresh state and are efficiently protected from deterioration due to contamination, dehydration or the influence of atmospheric oxygen.

Other objects and advantages of the invention will appear from the specification.

Many suggestions have been made for coating food products for cold storage so as to avoid contamination and prevent desiccation of the products during the treatment and the subsequent storage period. In particular, it has been suggested to subject food products such as fish to a so-called quick-freezing process, and in order to prevent evaporation and dehydration the frozen fish or other food products have been coated by an envelope or glaze of ice completely surrounding the product, such glazing being effected by dipping in or spraying with cold water. Moreover, it has been proposed to subject the frozen and glazed food stuffs to a further treatment, whereby the ice glaze surrounding the frozen product is subsequently coated with a resistant, impervious coating such as wax, resin and rubber.

The present invention relates to a method of a similar kind, including the formation of an ice glaze and an external coating of an impervious and resistant material, but in contradistinction to the known methods referred to, the two coatings, i. e. the ice glaze and the external, impervious and resistant coating are produced simultaneously in one single operation which, moreover, ensures efficient sterilization of the food stuffs and hence removes any risk of contamination.

The present invention in general comprises the steps of subjecting the food product to a quick-freezing process preferably at a temperature of about −20° C. and thereupon treating the quickly frozen product with a polythene at a temperature of about 115° C. Due to the "shock-effect" of suddenly exposing the frozen product to the comparatively high temperature of the molten polythene, I have found that I can produce the following useful results:

(1) The moisture inherent in the food stuffs which, owing to the quick-freezing process, is transformed into a multitude of finely divided ice crystals, is suddenly evaporated and extracted to the surface of the food stuffs where, due to the preponderance of the cold reservoir within the product, it is subsequently condensed and forms an ice glazing surrounding the entire surface of the product.

(2) Simultaneously, the molten polythene which is suddenly exposed to the extremely low temperature of the frozen product solidifies and forms a protective coating surrounding the ice glaze.

(3) Since no water from outside the food stuff is used for preparing the ice glaze, and since the temperature of the molten polythene is of the order of 115 to 120° C., the process will be accompanied by a complete and efficient sterilization.

I have found that polythene, which melts at a temperature of about 115° C., is particularly suitable for this process, this being partly due to the fact that polythene has an extremely low affinity towards water and therefore presents the most favourable conditions for the formation of the ice glaze. Moreover, a coating of polythene is extremely rigid and resistant and is completely impervious to air and moisture. The treatment with molten polythene or a similar thermoplastic material should preferably be of very short duration, e. g. of the order of a few seconds. The molten polythene may be applied by spraying in any well-known manner, or the quickly frozen food stuffs may be dipped into a bath of the molten material.

The ice glaze produced from the moisture inherent in the food stuff provides an efficient protection from dehydration, and the external protective coating further prevents any contamination or oxidation due to cracking, leakage or evaporation of the glaze.

The food stuffs treated in accordance with the invention may be stored at temperatures slightly below the freezing point of water for practically any length of time without shrinkage of texture or loss of bloom or flavour. Upon thawing the protective coating may easily be removed and the food stuff is then ready for consumption.

In general, many modifications and variations of the invention hereinbefore set forth may be made without departing from the spirit and scope thereof and, therefore, only such limitations should be imposed as are indicated in the appending claims.

I claim:

1. A method for the simultaneous formation of an ice glaze enveloping the surface of frozen foodstuffs and an air-tight protective impervious coating surrounding said ice glaze, which comprises the steps of subjecting the foodstuffs to a quick-freezing process at a temperature of about −20° C. and applying molten polythene at a temperature of about 115° C. to the surface of said foodstuff, thereby producing a shock effect causing finely divided ice crystals to be extracted from the interior of the foodstuff and to form an ice glaze on the surface thereof surrounded by a continuous coating of polythene formed by the solidification of the molten polythene upon contacting the surface of the frozen foodstuff.

2. The method of claim 1, in which the molten polythene is applied to the frozen foodstuff by spraying.

3. The method of claim 1, in which the molten polythene is applied to a frozen foodstuff by dipping the frozen foodstuff into a bath containing the molten polythene.

References Cited in the file of this patent

UNITED STATES PATENTS

| | | |
|---|---|---|
| 2,337,645 | Cadwell | Dec. 28, 1943 |
| 2,462,760 | Mitchell et al. | Feb. 22, 1949 |
| 2,551,463 | Ramsbottom | May 1, 1951 |
| 2,556,278 | Irvine | June 12, 1951 |

OTHER REFERENCES

"British Plastics," May 1945, pages 208 to 215 and 228, article entitled "The Properties and Uses of Polythene" by E. L. Midwinter.

"Scientific American," June 1947, page 258.

"Food Industries," June 1949, pages 48 and 49, article entitled "'Poly' Wrap Seen Filling Many Packaging Needs."

"Modern Packaging," August 1949, page 121.

"Food," March 1950, page 107, article entitled "Polythene Lined Paper Bags."